(12) United States Patent
Lidstrom et al.

(10) Patent No.: US 8,121,049 B2
(45) Date of Patent: Feb. 21, 2012

(54) METHOD AND ARRANGEMENT FOR CONTROLLING SERVICE LEVEL AGREEMENTS IN A MOBILE NETWORK

(75) Inventors: Mattias Lidstrom, Stockholm (SE);
Raul Benito Garcia, Colmenar Viejo (ES); Tony Larsson, Upplands Vasby (SE); Niklas Björk, Uppsala (SE); Tor Kvernvik, Taby (SE); Mona Matti, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 12/516,047

(22) PCT Filed: Nov. 29, 2006

(86) PCT No.: PCT/SE2006/001364
§ 371 (c)(1), (2), (4) Date: Dec. 8, 2009

(87) PCT Pub. No.: WO2008/066419
PCT Pub. Date: Jun. 5, 2008

(65) Prior Publication Data
US 2010/0091671 A1    Apr. 15, 2010

(51) Int. Cl.
*G01R 31/08* (2006.01)

(52) U.S. Cl. .......................................... 370/252

(58) Field of Classification Search ............... 370/252, 370/393; 709/224, 238
See application file for complete search history.

(56) References Cited

U.S. PATENT DOCUMENTS

| | | | |
|---|---|---|---|
| 7,496,655 B2 * | 2/2009 | Gopalan et al. | 709/224 |
| 2005/0027851 A1 * | 2/2005 | McKeown et al. | 709/224 |
| 2007/0156919 A1 * | 7/2007 | Potti et al. | 709/238 |

FOREIGN PATENT DOCUMENTS

| | | |
|---|---|---|
| EP | 1 259 030 A2 | 11/2002 |
| WO | WO 0117169 A2 | 3/2001 |
| WO | WO 03/084133 A1 | 10/2003 |

OTHER PUBLICATIONS

Rosenberg. J. et al. SIP: Session Initiation Protocol. Network Working Group. RFC 3261. Jun. 2002.

* cited by examiner

*Primary Examiner* — Ricky Ngo
*Assistant Examiner* — David Oveissi

(57) ABSTRACT

A method and an arrangement in a service assurance module for controlling service level agreements for communication services in a mobile services access network. A network performance rule is created for a service level agreement, and is based on an associated performance indicator indicating the current network performance with respect to the fulfillment of the service level agreement. The performance indicator is then monitored, and the network performance rule is evaluated on a regular basis based on the performance indicator. If the network performance rule is not satisfied, an agreement violation is registered and/or measures are taken to improve the network performance.

18 Claims, 3 Drawing Sheets

METHOD AND ARRANGEMENT FOR CONTROLLING SERVICE LEVEL AGREEMENTS IN A MOBILE NETWORK

TECHNICAL FIELD

The present invention relates generally to a method and arrangement for determining whether service level agreements are fulfilled in a mobile services access network. In particular, any quality-related problems in the network that may have a negative impact on service level agreements, may be detected and redeemed.

BACKGROUND

With the emergence of 3G mobile telephony, new packet-based communication technologies using IP (Internet Protocol) have been developed to support wireless communication of multimedia. For example, communication protocols in GPRS (General Packet Radio Service) and WCDMA (Wideband Code Division Multiple Access) support packet-switched multimedia services, as well as traditional circuit-switched voice calls.

A network architecture called "IP Multimedia Subsystem" (IMS) has been developed by the $3^{rd}$ Generation Partnership Project (3GPP) as a platform for handling multimedia services and sessions in the packet domain, based on IP transport. Thus, an IMS network can be used to initiate and control multimedia sessions for IP enabled terminals being connected to any type of access networks. A signalling protocol called "SIP" (Session Initiation Protocol, according to the standard IETF RFC 3261) has been defined for handling sessions in IMS networks. A "SIP-enabled" terminal can thus use this standard to initiate and terminate multimedia communications by means of its home IMS network.

FIG. 1 is a simplified schematic illustration of a basic network structure for providing multimedia services for a mobile terminal A by means of an IMS network 100. The terminal A is connected to a mobile access network 102 and communicates in a multimedia session with another terminal B which may be connected to the same access network 102 or another access network (not shown). Alternatively, terminal A may communicate with a content server or the like, e.g. for downloading some multimedia content therefrom.

The access network 102 is connected to IMS network 100 which is the "home" IMS network of terminal A and therefore handles the session with respect to terminal A. The same IMS network 100 or another one (not shown), may handle the session on behalf of terminal B. Moreover, multimedia services are always handled by the terminal's home IMS network even if terminal A would be roaming in a visited access network.

The session is controlled by specific nodes in the IMS network 100, here generally referred to as "session managing nodes" 104. These nodes include S-CSCF (Serving Call Session Control Function), I-CSCF (Interrogating Call Session Control Function) and P-CSCF (Proxy Call Session Control Function, according to the conventional IMS architecture. Briefly described, a P-CSCF node acts as an entry point towards the IMS network 102 from access networks, including network 100, a plurality of S-CSCF nodes are assigned to active terminals for managing their sessions using SIP signalling, and an I-CSCF node acts as a gateway for SIP messages from other IMS networks.

The IMS network 102 also includes one or more application servers 106 for enabling various multimedia services, and a main database element HSS (Home Subscriber Server) 108 containing subscriber and authentication data. The various functions of the shown network elements 104-108 are generally known in the art, and not necessary to describe here further to understand the context of the present invention. Of course, IMS network 102 contains various other nodes and functions not shown here for the sake of simplicity. In the figure, the thick two-way arrow illustrates the communication of payload data between the two terminals A, B. The thin two-way arrow illustrates the communication of control messages, typically according to SIP in the case of IMS.

A policy unit 110 associated with the access network 102 is also connected to the IMS network 100. The policy unit 110 is basically responsible for authorizing communication sessions for terminals connected to the access network 102, based on various predetermined policies and rules. The policy unit 110 generally operates according to a function implemented therein called PCRF (Policy and Charging Rule Function), sometimes alternatively referred to as PDF (Policy Decision Function).

The PCRF uses a rule engine that evaluates session information related to a requested session, in order to determine whether the session can be allowed or not. A session may be allowed conditionally, e.g., "session X is allowed if condition Y is met". Session admission rules defined in the rule engine of policy unit 110 specify when to allow sessions for specific users and/or services. The rules can be combined into policies which may be defined for specific users or services, or both. When a session request is received from a user for a specific service, a relevant policy or rule combination is thus selected and evaluated for the session request for allowance or rejection.

Many mobile applications and services require a certain Quality of Service QoS in order to provide a satisfying and expected result to end-users. For UMTS networks, four main traffic classes have been defined: "conversational class", "streaming class", "interactive class" and "background class", in order to classify different needs and requirements regarding bit rates and delays. These traffic classes are primarily distinguished by their requirements regarding transfer delays, such that applications of the conversational class tolerate only small delays, sometimes also referred to as "real-time", whereas the background class is applied to the least delay-sensitive applications, sometimes also referred to as "best effort".

The selection of a UMTS traffic class for an application is used for assigning a suitable physical channel in the mobile network, generally referred to as a RAB (Radio Access Bearer), in order to optimise the scarce radio recourses and other transport resources in the radio access and core networks whilst maintaining an acceptable and expected level of quality for the end-user.

Another factor that may dictate the QoS requirements is the subscription type. Thus, subscribers may be offered specific service levels with respect to QoS for different subscription types. For example, using current terms, a "Platinum" subscription may be defined to guarantee a relatively high level of service or QoS, whereas "Gold", "Silver" and "Bronze" subscriptions may provide successively lower levels of service or QoS. Moreover, specific services may also be offered with different levels of QoS, e.g. at different prices.

FIG. 2 illustrates a conventional process when a mobile terminal A will communicate multimedia with another party B, involving different stages 2:1-2:9 as illustrated. Here, each stage may generally represent the communication of various messages and/or data back and forth which are not necessary to describe in more detail.

IMS nodes P-CSCF 202 and S-CSCF 204 are shown here in a schematic "control plane" for control signalling over the IMS network. Further, a gateway node GW 200 in the core part of a mobile network, typically a GGSN (Gateway GPRS Switching Node), is shown in a schematic "bearer plane" used for the data transport. The gateway node GW 200 is connected to an associated policy unit 206, here denoted PCRF, which is thus basically responsible for authorizing communication sessions to terminals in the associated mobile network, as described above. In some systems, a so-called "Policy and Charging Enforcement Function" (PCEF) in the GGSN node typically communicates with the PCRF node over a Gx interface to control the access admission, and the PCRF node communicates with the P-CSCF node over an Rx interface.

In a first stage 2:1 of the illustrated procedure, terminal A obtains an initial connection with the mobile network, typically involving the activation of a PDP context and a Radio Access Bearer RAB, as established by the gateway node GW 200. A particular PCRF 206 is also selected for terminal A by GW 200 at this point. The established access bearer is primarily used for carrying occasional control messages of minor size such as service requests, allowing for relatively low bandwidth and fairly long delays.

In a next stage 2:2, GW 200 sends relevant access information to PCRF 206, including a subscription identifier and the bearer information established in stage 2:1. Thereby, a "state" is created in PCRF 206 for a "bearer session", meaning that the received access information for terminal A is retained in PCRF 206. In this stage, PCRF 206 also responds to GW 200 by sending a so-called "basic charging rule" that has been selected or created based on the received access information. The basic charging rule includes a charging key, a charging identity and any service data flow filters that should be applied on communicated data according to that rule. A certain basic level of QoS, typically the "best effort" level, has now also been established for non-IMS data services such as the communication of various control messages as mentioned above.

When a user activates a selected application in terminal A in order to communicate with terminal B in this case, an SIP-based user agent ("SIP UA") in terminal A performs a session negotiation in a following stage 2:3, which may involve the exchange of terminal capabilities with terminal B. In the session negotiation, terminal A may start by sending an SIP INVITE message as a session request towards terminal B containing session-specific parameters typically including a proposed coder/decoder (or "codec") for the session.

After the session negotiation, as the session parameters have been settled, the P-CSCF node 202 sends corresponding service information to PCRF 206, in a next stage 2:4. Thereby, another state is created in PCRF 206 for a "service session", meaning that the received service information for the session of terminal A is retained in PCRF 206. Moreover, PCRF 206 determines whether the requested session should be allowed or not by applying a suitable policy.

If PCRF 206 can allow the requested session according to the applied policy for the given user and service, an OK message is sent to the P-CSCF node 202 which also sends an OK message to the terminal A, in a stage 2:5. The application activated in terminal A then requests a bearer from a bearer part in terminal A, in a following stage 2:6, in order to satisfy QoS requirements for communication according to the application. Terminal A then issues a bearer request for service data transport to GW 200 in the mobile network, in a next stage 2:7. Alternatively, the establishment of bearer may also be initiated by the mobile network.

In a further stage 2:8, GW 200 now establishes a new bearer for the forthcoming data transport, as required by the service, and sends relevant QoS information on the established service bearer to PCRF 206 where the bearer session state is updated accordingly. In this stage, PCRF 206 also responds to GW 200 by sending an updated charging rule based on the received service and QoS information. The updated charging rule includes a service identity, a charging identity and any service data flow filters according to that rule. Hence, a certain level of QoS has also been established for the requested service, typically a higher QoS level than the one established for non-IMS data services in stage 2:2 above.

The above-mentioned basic charging rule and updated charging rule established for terminal A in stages 2:2 and 2:8, respectively, are often referred to as "PCC (Policy and Charging Control) rules", in effect being rules for session admission. In general, a PCC rule is used for detecting packets belonging to a service data flow, identifying the service, and for providing relevant charging parameters and policy control for a data flow. A PCC rule may be predefined or created dynamically, and includes basically a rule name, a service identifier, service data flow filters, QoS parameters and charging parameters.

Finally, terminal A can start the session involving the communication of data between the two terminals A and B, as illustrated by a final step 2:9. The new service bearer or RAB established in stage 2:8 should be more stable and reliable than the access bearer established for control messages in stage 2:2, to provide a "guaranteed" level of QoS according to the service involved as controlled by the updated charging rule. As mentioned above, different levels of QoS may also be expected depending on the subscription and/or selected level of service.

However, the mobile network will undoubtedly sometimes fail to fulfil the agreed level of QoS during such sessions. The reasons for not providing the agreed levels of service can be many, often depending on the current traffic situation such as cell congestion and interference problems, but also on factors related to the operation of the network such as inadequate power regulation, equipment failure, inaccurate channel allocation and poor radio coverage, etc.

Today, there is no efficient way to monitor service level agreements in mobile networks, and consequently it cannot be controlled that these agreements are met properly. Hence, if a customer complains that an expected QoS level has not been fulfilled during a session, the network operator has no means to check the relevance thereof. Moreover, the operator cannot work proactively to ensure that service level agreements are fulfilled. Instead, a reactive process must be used for investigating a network in order to identify such problems and where they typically occur. This is an expensive and time consuming activity that nonetheless must be undertaken in order to improve the fulfillment of service agreements, and to avoid customer dissatisfaction and the paying of resulting penalty fees.

SUMMARY

It is an object of the present invention to address the problems outlined above. More specifically, it is an object of the present invention to make it possible to detect and identify any performance shortcomings that may jeopardize service level agreements in a mobile services access network, in order to take suitable measures to remedy such deficiencies.

These objects and others can be obtained by providing a method and an arrangement according to the independent claims attached below.

According to one aspect, the present invention involves a method of controlling a service level agreement for a communication service in a mobile services access network. The method includes creating a network performance rule valid for the service level agreement and being based on an associated performance indicator indicating the current network performance with respect to the fulfillment of the service level agreement. The method further includes monitoring the performance indicator and evaluating the network performance rule based on the monitored performance indicator. An agreement violation is then registered and/or measures are taken to improve the network performance, if the evaluated network performance rule is not satisfied.

According to another aspect, the present invention also involves a service assurance module in a mobile services access network for controlling service level agreements for communication services. The service assurance module comprises means for creating a network performance rule valid for a service level agreement and being based on an associated performance indicator indicating the current network performance with respect to the fulfillment of the service level agreement. The service assurance module further comprises means for monitoring the performance indicator, means for evaluating the network performance rule based on the monitored performance indicator, and means for registering an agreement violation and/or for taking measures to improve the network performance, if the network performance rule is not satisfied.

The invented method and service assurance module may optionally have the following further characteristics.

The measures to improve network performance may include modifying or adding a session admission rule applied for individual terminals and session requests, to introduce access constraints. The session admission rule is then used by a rule engine of a policy unit to control the admission of individual sessions.

The network performance rule may include a degradation rule specifying a degradation level of the monitored performance indicator, and a violation rule specifying a violation level of the monitored performance indicator when the service level agreement is deemed to be violated. The degradation and violation rules are conditional by dictating said measures to improve network performance if the respective rule is not met, and the violation rule is evaluated if the degradation rule is not satisfied.

The network performance rule may be dependent on a plurality of associated performance indicators indicating different aspects of the current network performance with respect to the fulfillment of the service level agreement.

The monitored performance indicator(s) may be derived from a session database used by the mobile network and may relate to any of: bandwidth occupation, latency, packet loss rate, available bitrate, or network and service accessibility.

The present invention makes it possible to create specific service level agreements for individual services and/or subscribers, and to ensure that these agreements can be substantially satisfied. Performance problems occurring in a network can also be identified and located, by means of monitored performance indicators declared in network performance rules. Thereby, the network operator can work proactively in order to avoid the violation of service level agreements.

Further features of the present invention and its benefits will be explained in the detailed description below.

BRIEF DESCRIPTION OF THE DRAWINGS

The present invention will now be described in more detail by means of preferred embodiments and with reference to the accompanying drawings, in which.

DETAILED DESCRIPTION

Briefly described, the present invention involves a service assurance module or similar including a "network performance rule engine", referred to as the "SLA rule engine" for short in the following description, which can be used to improve the fulfillment of service level agreements (SLA) in a mobile services access network. The SLA rule engine is thus used for monitoring whether such agreements are satisfied, based on network performance rules that have been derived or translated from the agreements, and can also be used for controlling network resources to remedy or avoid any violations thereof.

The SLA rule engine is connected to the above-described session admission rule engine in the policy unit PCRF, hereafter referred to as the "PCRF rule engine". Thus, whereas the session admission rules in PCRF (i.e. PCC rules) are applied for individual terminals and session requests to control session admission, the network performance rules in the SLA rule engine are evaluated with respect to network performance for subscriber groups and/or specific services, which in turn depends on the outcome from the PCRF rule engine. Hence, the results from the SLA rule engine indicate the extent of service level agreement fulfillment. The outcome from the SLA rule engine can then be used for detecting any overloading or deficiencies in the mobile network, and for improving the network performance by controlling network resources, in a manner that will be described below by means of exemplary embodiments.

The rules in the SLA rule engine may be frequently evaluated on a regular basis, e.g. at intervals of five minutes. An SLA rule may specify a maximum period of time during which an SLA violation can be tolerated, which of course will depend on the nature of agreement and service. In other words, in may be deemed acceptable that an SLA is violated temporarily, as long as it is fulfilled again within the set time period.

In order to determine whether an SLA is fulfilled or not, one or more performance indicators are monitored, hereafter referred to as the "Key Performance Indicator", KPI. A KPI generally indicates the performance in the network with respect to a predefined factor or parameter relevant for an evaluated SLA rule, that can be detected or measured to determine a current KPI value or level, which typically fluctuates over time.

The KPI values may be derived from information in a session database maintained in the mobile network, but also from other information sources, and the present invention is not limited in this respect. For example, a KPI may relate to bandwidth occupation, latency, packet loss rate, available bitrate, or network and service accessibility, etc., although the present invention is not limited to these examples neither. Thus, a plurality of KPI's related to different aspects of network performance may be monitored in order to evaluate rules in the SLA engine and ultimately the fulfillment of service level agreements.

Figure 1:
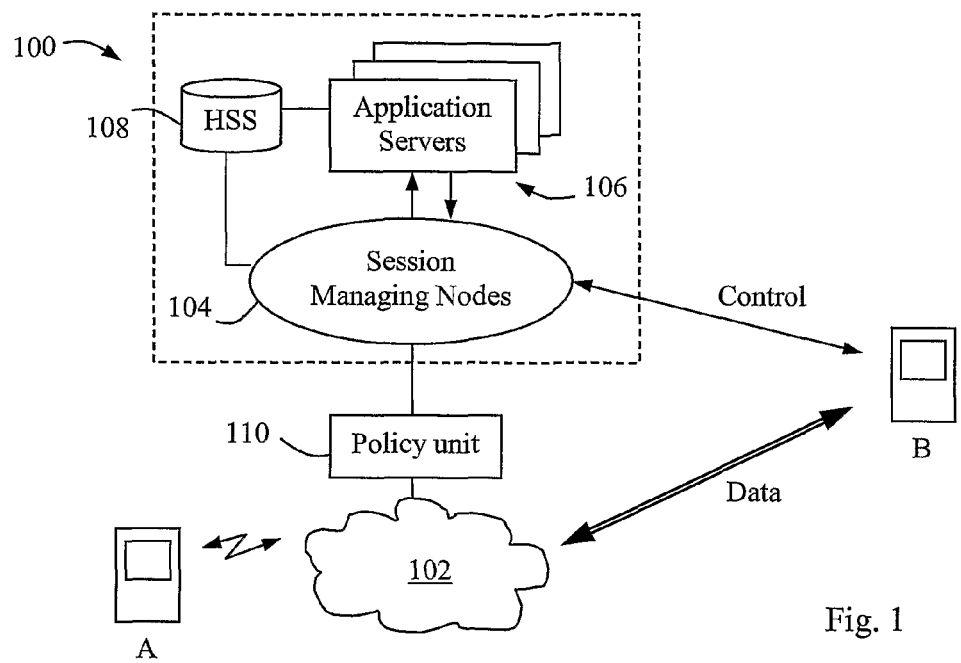
FIG. 1 is a schematic communication scenario of a multimedia session between two mobile terminals A and B using a conventional IMS network, according to the prior art.
Figure 2:
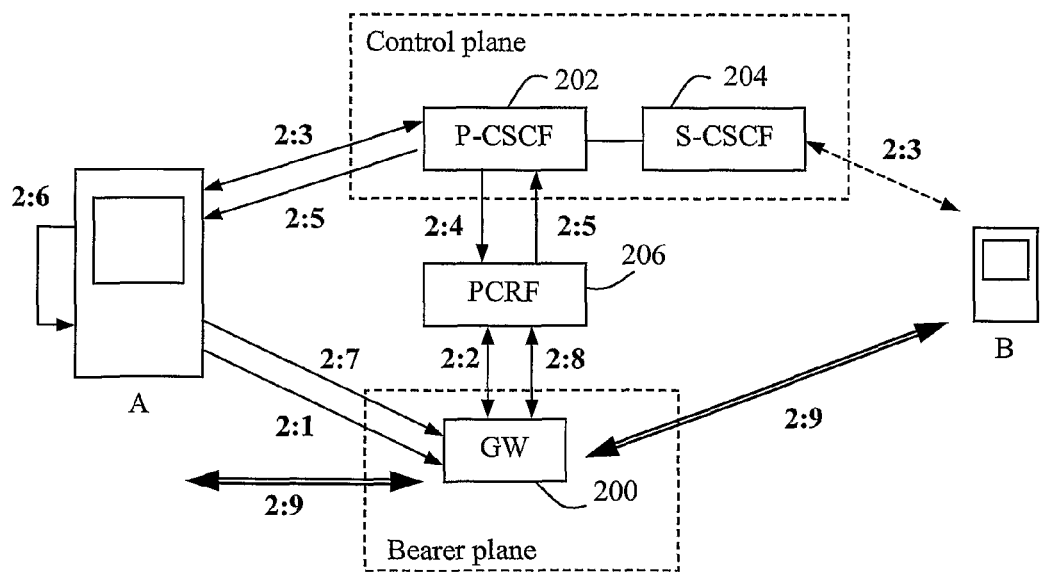
FIG. 2 illustrates a conventional signalling flow during the establishment of a session between terminals A and B using a policy unit PCRF, according to the prior art.
Figure 3:
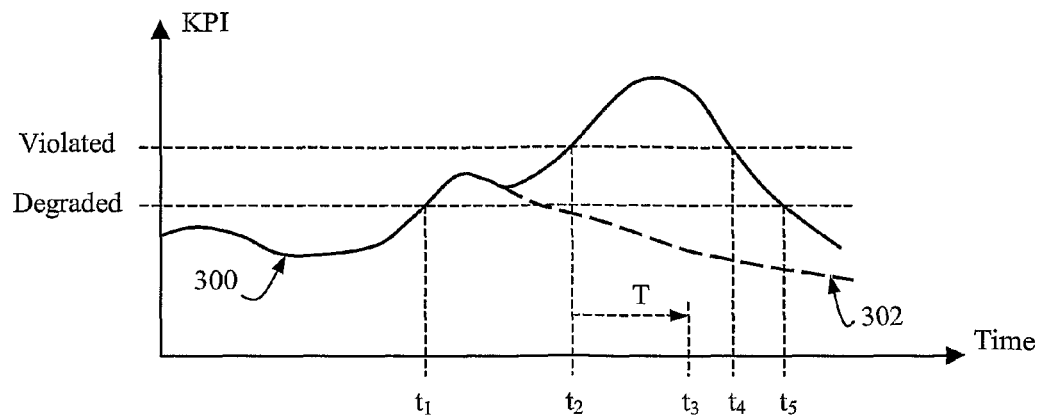
FIG. 3 is a diagram illustrating the fluctuations of a monitored network performance indicator over time.

FIG. 3 is a schematic diagram of an exemplary performance indicator KPI being monitored, where the horizontal axis represents time and the vertical axis represents the KPI level. In this example, the KPI is related to the occupation of bandwidth in a certain area such as a cell or group of cells in a mobile network, and/or for a specific service. The curve 300 thus represents the measured KPI over time. In general, the KPI level is high when a large percentage of the available bandwidth is occupied, and vice versa.

In this case, a violation level of the KPI has been predefined, as indicated in the figure. Basically, a service level agreement SLA ensuring a certain amount of free bandwidth in the monitored area and/or service, will be violated if the KPI value exceeds the violation limit for more than a predetermined maximum acceptable time period T. Further, a relatively lower KPI level has also been defined over which the bandwidth availability is considered to be degraded, as indicated in the figure.

As can be seen in the figure, the fluctuating KPI stays below the degradation level until the time $t_1$. Thereafter, the KPI exceeds the degradation level, and the KPI increases further to even exceed the violation level at the time $t_2$. In this case, the violation level has been exceeded for more than the maximum acceptable time period T after the time $t_3$, until the KPI decreases to fall below the violation level at the time $t_4$, and finally also below the degradation level at the time $t_5$. Hence, a service level agreement being dependent on the KPI depicted in FIG. 3 is considered to be violated during the period between $t_3$ and $t_4$, i.e. after the maximum acceptable time period T.

In the example above, as soon as the KPI level rises above the degradation level after $t_1$, it is possible to determine why and where the degradation has occurred, as indicated by the KPI. Thereby, suitable measures can be taken in the mobile network at some point after $t_1$ to control network resources, in order to remedy the problem and improve the bandwidth availability such that the KPI level does not rise further to unacceptable levels. For example, the KPI results can be used for modifying and/or adding selected PCC rules to control the bandwidth occupation, e.g., by introducing access constraints or the like in the PCC rules. Thus, once the KPI becomes degraded, session admission may be denied or restricted for certain services and/or subscribers in order to improve the bandwidth availability for other services and/or subscribers with higher priority.

In this way, the performance problem can be redeemed proactively by controlling network resources, such that the KPI level is kept within acceptable limits, as indicated by an exemplary dashed curve 302 in FIG. 3. Violation of the associated SLA can then be avoided or at least reduced.

In order to evaluate the fulfillment of service level agreements in a mobile network, different "Service Level Objectives" (SLO) may be defined based on monitored performance indicators (KPI), such that one or more specific performance indicators are associated with each service level objective. Thus, a service level objective SLO is basically deemed to be fulfilled as long as no associated performance indicator KPI exceeds a predefined violation level for more than a maximum acceptable time period.

Figure 4:
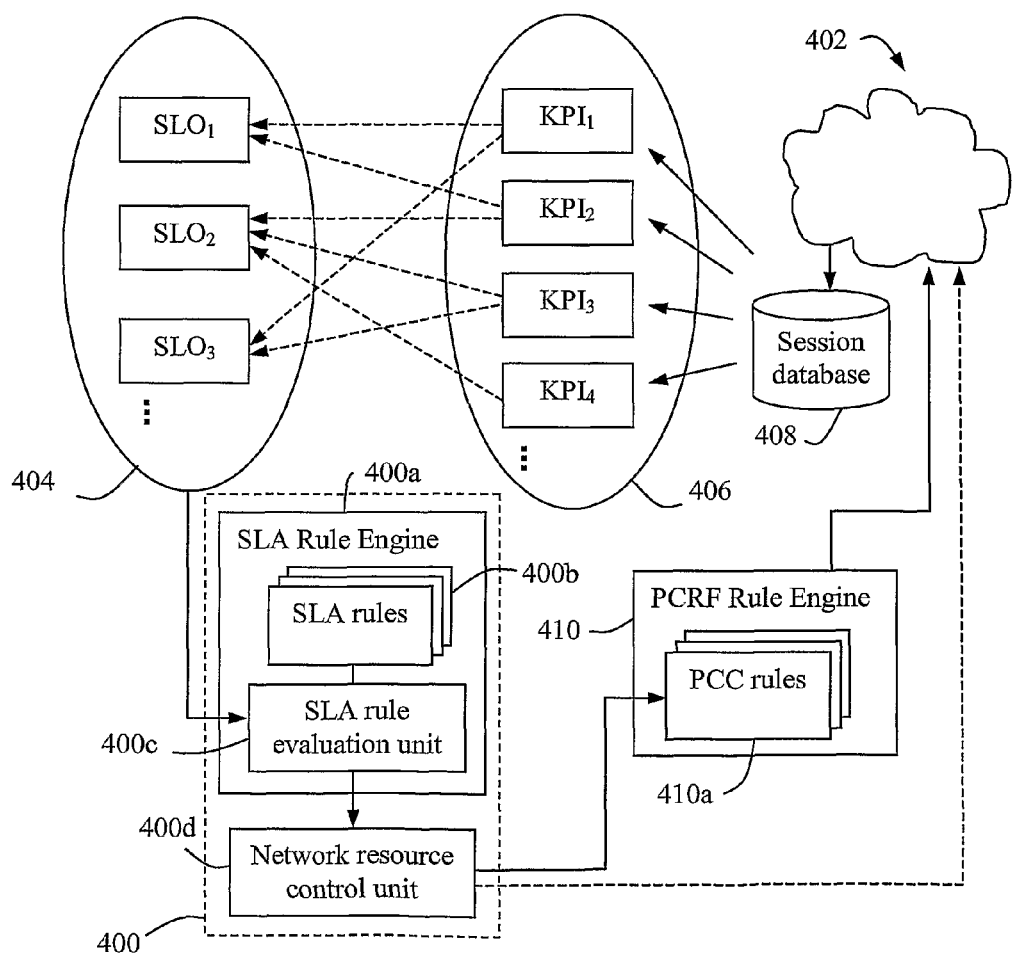
FIG. 4 is a block diagram illustrating the operation of a network performance rule engine connected to a session admission rule engine, according to one embodiment.

FIG. 4 illustrates schematically the operation of a service assurance module 400 comprising an SLA rule engine 400a, according to one embodiment. In the SLA rule engine 400a, one or more SLA rules 400b (i.e. network performance rules) have been defined to evaluate the network performance with respect to SLA's (i.e., service level agreements) for subscribers and/or services in a mobile services access network 402.

A plurality of service level objectives 404 have also been defined for the SLA rule engine 400a, each being dependent on one or more performance indicators 406. An SLA rule may basically involve one or more SLO's. In this example, a first service level objective $SLO_1$ is associated with performance indicators $KPI_1$ and $KPI_2$. Further, a second service level objective $SLO_2$ is associated with performance indicators $KPI_2$, $KPI_3$ and $KPI_4$, and a third service level objective $SLO_3$ is associated with performance indicators $KPI_1$ and $KPI_4$, respectively.

The SLA rule engine 400 further includes a rule evaluation unit 400c receiving KPI measurements for each SLO 404, which is adapted to evaluate the SLA rules 400b based on the received KPI measurements. The mobile network 402 and the subscribers and services therein effectively constitute the environment in which the measured KPI's are formed. The KPI's 406 may be derived from a session database 408 used by the network 402, as illustrated by arrows, but also from other sources of network information, not shown.

The service assurance module 400 further comprises a resource control unit 400d adapted to generally control network resources, in response to the evaluation of the SLA rules in the evaluation unit 400c. A conventional PCRF rule engine 410 is used by the mobile network 402 to control session admission for its subscribers and services, and the network resource control unit 400d is connected thereto. The control unit 400d is further adapted to modify and/or add PCC rules 410a in the PCRF rule engine 410 in response to the SLA rule evaluation, to control resources in network 402 such that any SLA violations can be avoided or at least reduced, as described above.

The control unit 400d may also be adapted to influence resources and operations in network 402 in other ways, as schematically indicated by the dashed arrow. For example, channel allocation schemes, power regulation and radio coverage, etc., may be modified in response to the evaluation of SLA rules using methods and routines well-known to the skilled person.

It should be noted that the arrangement depicted in FIG. 4 is purely logical and can be implemented in different ways. For example, the SLA rule engine 400a and the network resource control unit 400d can be arranged together as the shown service assurance module 400, but may also be arranged as separate connected entities. The components 400a-d in the shown service assurance module 400 may further be integrated with the PCRF Rule Engine 410, or implemented as a separate connected module, node or system. An Operation and Maintenance (O/M) interface (not shown) to the SLA rule engine 400a may be used allowing an Operation and Support System (OSS) to supervise the fulfillment of SLA's, and providing the possibility to operators in a Network Operation Centre (NOC), to modify parameters in SLA Policies to control SLA fulfillment.

As shown by means of various arrows, the arrangement in FIG. 4 basically produces a network control "loop" for optimising the usage of network resources in order to fulfil prevailing SLA's. Thus, the session database 408 (and possibly also other information sources, not shown) provides KPI values 406, associated with different SLO's 404. The evaluation unit 400c evaluates the SLA rules based on the obtained KPI values and the associated SLO's, and the outcome is used by the network resource control unit 400d to modify and/or add PCRF rules 410a (and possibly also to influence the network 402 in other ways, as indicated by the dashed arrow), if necessary. As a result, the network 402 will provide a different performance, as reflected in the session database 408 and otherwise, such that the measured KPI's 406 hopefully become improved.

Figure 5:
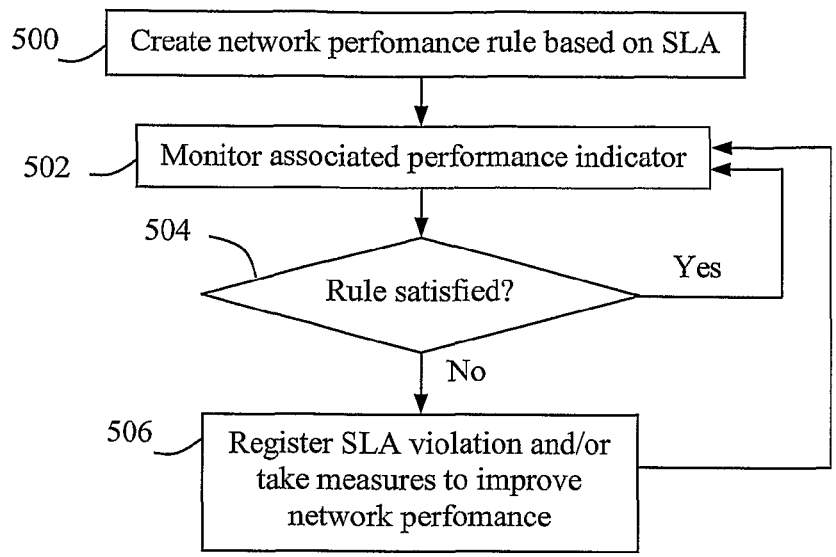
FIG. 5 is a flow chart illustrating a procedure for overseeing service level agreements in a mobile services access network, according to another embodiment.

FIG. 5 is a flow chart of steps executed by a service assurance module or similar, adapted to oversee service level agreements in a mobile services access network and control network resources such that violations of the service level agreements can be avoided or at least reduced. In a first step 500, a network performance rule is created based on one or more service level agreements valid for the mobile network. At least one associated performance indicator is monitored in a next step 502, the level of which indicating whether any of the created service level agreements is fulfilled or not.

In a following step 504, it is determined whether the network performance rule is satisfied or not, based on the monitored performance indicator(s). If the rule is satisfied, the process returns to step 502, such that steps 502 and 504 are repeated on a regular basis, e.g. at intervals of five minutes.

However, if the network performance rule is not satisfied in step 504, some different options are possible for the next step 506. One option is that a failure or breach of the service level agreement associated with the created network performance rule can be simply registered or logged in a database or the like, e.g. in order to collect SLA statistics. Another option in step 506 is that suitable measures are taken to somehow improve the network performance as relevant to the evaluated network performance rule, in response to a negative outcome of step 504, in order to influence the environment of the mobile network in a way that the service level agreement can be safely met again. For example, at least one session admission rule can be modified or added in a PCRF rule engine or similar, e.g. as described for FIG. 4 above. As indicated in step 506, either or both alternatives are possible.

As mentioned above in connection with FIG. 3, two different network performance rules may be set for a particular performance indicator, which can be used for controlling network resources in an mobile network to avoid or reduce any violation of the corresponding SLA. A first "degradation" rule specifies a degradation level or limit of the KPI as described for FIG. 3. The degradation rule is also "conditional" by dictating measures to be taken for changing the admission of sessions in order to remedy the network performance degradation, if the rule is not met. Further, a second "violation" rule specifies a violation level or limit of the KPI when the network performance has deteriorated so that a service level agreement is deemed to be violated, e.g. when the violation limit is exceeded for more than a predetermined time period. The violation rule is also "conditional" in the same manner.

Figure 6:
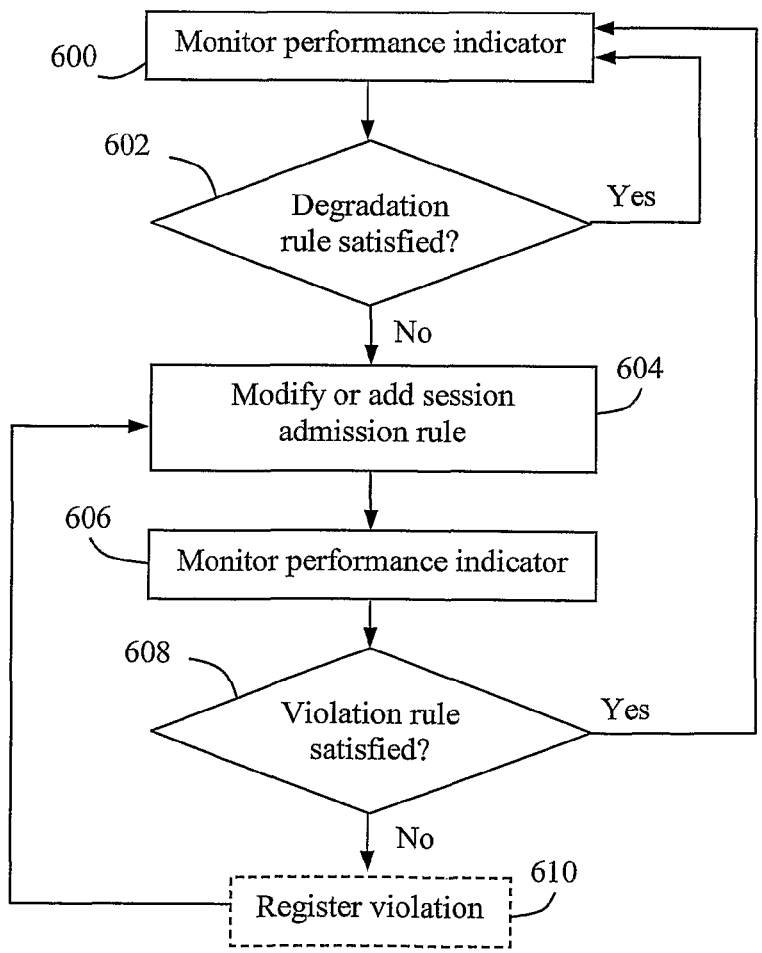
FIG. 6 is a flow chart illustrating a procedure for controlling network resources in a mobile services access network based on at least one monitored performance indicator, according to another embodiment.

FIG. 6 is a flow chart illustrating a procedure for controlling network resources proactively in a mobile services access network, according to another embodiment, by using the above-mentioned degradation and violation rules created for a prevailing SLA, to avoid or at least reduce the violation of that SLA. The following example is concerned with only one performance indicator KPI and one session admission rule, even though the present invention is not limited in this respect but can be used for any number of performance indicators, session admission rules, network performance rules and service level agreements.

It is assumed that a degradation rule and a violation rule has been created with respect to a certain SLA as described above.

In a first illustrated step 600, a performance indicator KPI is monitored, being relevant for the two network performance rules. In a next step 602, the degradation rule is evaluated to determine whether it is met or not, according to the monitored performance indicator. As long as the degradation rule is satisfied, it is still evaluated on a regular basis as described above, thus repeating steps 600 and 602 frequently.

However, if the degradation rule is not satisfied in step 602, a session admission rule is modified or added, in a step 604, hopefully impacting the monitored performance indicator. The session admission rule (i.e. PCC rule) may reside in a PCRF rule engine implemented in a policy unit controlling session admission for individual session requests in the mobile network, as shown in FIG. 4. The degradation rule may thus dictate that if the KPI exceeds the degradation level or limit, the session admission rule should be modified in a specific way. For example, if the monitored performance indicator is bandwidth usage for service X, the degradation rule may dictate: "if the allocated bandwidth for service X exceeds 60%, downgrade bandwidth 1 level for Bronze subscribers".

Once the session admission rule has been modified or added, the performance indicator hopefully changes to the better, which is monitored further in a following step 606. It is then determined whether the violation rule is satisfied in a further step 608. If so, the process may return to the initial steps 600 and 602 to find out whether the performance indicator has improved such that the degradation rule is now also met.

However, if neither the violation rule is satisfied in step 608, an SLA violation may be registered or logged in a suitable database or the like, as indicated by an optional step 610. In any case, a session admission rule is once again modified or added, by returning to step 604. At this stage, the session admission rule modified or added previously in step 604 may be further modified this time, e.g. by introducing harder access constraints or the like. However, any other session admission rule could be modified or added, depending on the implementation, and the present invention is not limited in this respect.

The violation rule evaluated in step 608 may thus dictate that if the KPI exceeds the violation level, the previously modified or added session admission rule should be modified further. For example, if the degradation rule example given above has been used for steps 602 and 604, the violation rule may dictate: "if the allocated bandwidth for service X exceeds 80% for more than 5 minutes, deny access for Bronze subscribers".

It is possible to define network performance rules in many different ways, based on various performance indicators. As mentioned above, conditional degradation and violation rules may dictate different measures to be taken when the rules are not met, in order to remedy or avoid the network performance problems. As mentioned above, these measures may include measures taken on various network operational tools and methods, but involve primarily the modification or addition of session admission rules which will typically produce a swift result. For example, a frequently used service with short lived sessions can be targeted for enforcing restrictions since the effects will be instant in that case.

When it is determined that a conditional network performance rule is met again, after having introduced a restriction by modifying or adding a session admission rule according to the above, the situation may be restored by removing the restriction, e.g. after a predetermined delay period and/or when the monitored KPI falls below a certain level. The evaluated network performance rule may specify how and when a previously introduced restriction is to be removed.

More or less complex rule schemes may be created where different services affect each other. For example, a conditional degradation rule may dictate that if the allocated bandwidth for service X exceeds a certain limit, agreements on services X, Y and Z cannot be fulfilled for Platinum users, and therefore the access to one or more of these services is restricted for Bronze users.

Different service level agreements between a network operator and subscribers will be given different priorities, and different performance indicators KPI's can be given different priorities within each service level agreement as well. Using the present invention, it is therefore possible to create specific service level agreements for individual services and subscribers or subscriber groups, also ensuring that the agreements can be satisfied. The invention also provides a solution to identify any performance problems in a network and where they occur, since each KPI declared in the network performance rules can be monitored easily and efficiently. The network operator can thus work proactively in order to enhance service offerings and ultimately the end user experience.

The present invention may be implemented and configured as follows: SLA rules for one or more subscriber groups or categories may be created in connection with introducing a service. The service will thus have policies that are derived from the SLA which may be offered along with the service. These policies are made up of session admission rules (PCC rules) set in the PCRF rule engine and network performance rules (SLA rules) set in the SLA rule engine.

The PCC rules are focused on the single user and dictates how well a service will perform for the given user. On the other hand, the SLA rules are focused on how the service performs in the network, e.g. for a certain subscriber group or class, and how well the service performance matches the SLA between a service provider and an operator. The SLA rules are generally fewer than the PCC rules and require little effort from the operator of the system to install. Since an SLA rule is valid for a subscriber group (i.e., a large aggregated group of end-users), the number of such rules will be limited.

The fact that the PCC and SLA rules focus somewhat differently allows for different outcomes when changing either of the two. When the SLA rules operate on the PCRF policies by impacting the PCC rules as described above, both QoS and SLA fulfillment can be assured. Initially, a network operator would probably prefer to use the SLA rule engine only for "important" customers that actually have SLA's with the operator such as corporate customers and services. The present invention also enables the possibility for an operator to use the SLA rule engine to provide important feedback for subscribers and services based on various groupings that the operator is free to define.

Thus, the following useful characteristics may generally be obtained when using the present invention:

An SLA can be expressed in terms of concrete rules.

An SLA and the service performance can be easily but carefully monitored by frequently evaluating the corresponding SLA rule.

The network performance and the end user experience can be enhanced proactively.

The operator's revenue can hopefully be increased.

The amount of incoming complaints to a service/support desk (helpdesk) or the like can be reduced.

Moreover, As soon as the SLA rule engine outcome gives rise to a change of existing admission rules for any subscriber category or service, the helpdesk can be notified in runtime about the decision taken. For example, the SLA rule engine may provide the message that "all Bronze subscribers for the free Poker Service are currently at reject status due to extremely high interest in the Platinum World Cup Soccer Service". This type of notifications will thus enable improved end-user support through the helpdesk.

While the invention has been described with reference to specific exemplary embodiments, the description is in general only intended to illustrate the inventive concept and should not be taken as limiting the scope of the invention. For example, the SIP signalling protocol and IMS concept have been used throughout when describing the above embodiments, although any other standards and service networks may basically be used. The present invention is defined by the appended claims.

The invention claimed is:

1. A method of controlling the fulfillment of a service level agreement for a communication service in a mobile services access network, the method implemented by a service assurance module comprising the following steps:

creating a network performance rule derived or translated from said service level agreement and being based on one or more associated performance indicators indicating a current network performance with respect to the fulfillment of said service level agreement, monitoring said performance indicator(s), evaluating said network performance rule based on measurements of the monitored performance indicator(s), wherein the network performance rule includes a violation rule specifying a violation level or limit of the monitored performance indicator(s) so that said service level agreement is deemed to be violated if the monitored performance indicator(s) exceeds the violation level for more than a maximum acceptable time period, registering at least one of an agreement violation and controlling network resources to improve the network performance as relevant to the evaluated network performance rule in response to the evaluating step, if the evaluated network performance rule with respect to the violation rule is not satisfied;

the network performance rule further includes a degradation rule specifying a degradation level or limit of the monitored performance indicator(s), and taking proactive measures to improve the network performance once the evaluating step deems that the degradation rule is not met in an attempt to remedy a problem to avoid having to register the agreement violation.

2. A method according to claim 1, wherein said measures to improve network performance includes modifying or adding a session admission rule applied for individual terminals and session requests, to introduce access constraints.

3. A method according to claim 2, wherein the session admission rule is used by a rule engine of a policy unit to control the admission of individual sessions.

4. A method according to claim 1, wherein the degradation and violation rules are conditional by dictating said measures to improve network performance if the respective rule is not met.

5. A method according to claim 4, wherein the degradation rule is evaluated on a regular basis and the violation rule is evaluated if the degradation rule is not satisfied.

6. A method according to claim 1, wherein the network performance rule is dependent on a plurality of associated performance indicators indicating different aspects of the current network performance with respect to the fulfillment of said service level agreement.

7. A method according to claim 1, wherein a Service Level Objective is defined based on one or more monitored performance indicators, such that the service level objective is deemed to be fulfilled as long as the associated performance indicators remain within acceptable limits.

8. A method according to claim 1, wherein said one or more monitored performance indicators relate to any of: bandwidth occupation, latency, packet loss rate, available bitrate, or network and service accessibility.

9. A method according to claim 1, wherein the monitored performance indicator(s) is derived from a session database used by the mobile network.

10. A service assurance module in a mobile services access network for controlling the fulfillment of service level agreements for communication services in said network, comprising:
    means for creating a network performance rule derived or translated from a service level agreement and being based on one or more associated performance indicators indicating a current network performance with respect to the fulfillment of said service level agreement,
    means for monitoring said performance indicator(s),
    means for evaluating said network performance rule based on measurements of the monitored performance indicator(s), wherein the network performance rule includes a violation rule specifying a violation level or limit of the monitored performance indicator(s) so that said service level agreement is deemed to be violated if the monitored performance indicator(s) exceeds the violation level for more than a maximum acceptable time period,
    means for registering at least one of agreement violation and for controlling network resources to improve the network performance as relevant to the evaluated network performance rule in response to said evaluation, if the evaluated network performance rule with respect to the violation rule is not satisfied; and,
    the network performance rule further includes a degradation rule specifying a degradation level or limit of the monitored performance indicator(s), and proactive measures are taken by the controlling means to improve the network performance once the evaluating means deems that the degradation rule is not met in an attempt to remedy a problem to avoid having to register the agreement violation.

11. A module according to claim 10, wherein said measures taking means is adapted to modify or add a session admission rule applied for individual terminals and session requests, to introduce access constraints.

12. A module according to claim 11, wherein the session admission rule is used by a rule engine of a policy unit to control the admission of individual sessions.

13. A module according to claim 10, wherein the degradation and violation rules are conditional by dictating said measures to improve network performance if the respective rule is not met.

14. A module according to claim 13, wherein the evaluating means is adapted to evaluate the degradation rule on a regular basis, and to evaluate the violation rule if the degradation rule is not satisfied.

15. A module according to claim 10, wherein the network performance rule is dependent on a plurality of associated performance indicators indicating different aspects of the current network performance with respect to the fulfillment of said service level agreement.

16. A module according to claim 10, further comprising means for defining a Service Level Objective based on one or more monitored performance indicators, such that the service level objective is deemed to be fulfilled as long as the associated performance indicators remain within acceptable limits.

17. A module according to claim 10, wherein said one or more monitored performance indicators relate to any of: bandwidth occupation, latency, packet loss rate, available bitrate, or network and service accessibility.

18. A module according to claim 10, wherein the monitoring means is adapted to derive the performance indicator(s) from a session database used by the mobile network.

* * * * *